United States Patent [19]

Ingemann

[11] 4,434,907
[45] Mar. 6, 1984

[54] CONTAINER HAVING AN ORIGINALLY SEALED CONDITION WHICH CAN BE OPENED AND THEREAFTER CLOSED

[75] Inventor: Ole Ingemann, Ryslinge, Denmark

[73] Assignee: A/S Haustrup Plastic, Langeskov, Denmark

[21] Appl. No.: 446,879

[22] Filed: Dec. 6, 1982

[30] Foreign Application Priority Data

Dec. 7, 1981 [SE] Sweden ............................ 8107310

[51] Int. Cl.³ ............................................ B65D 17/40
[52] U.S. Cl. ................................... 220/276; 220/270; 220/306
[58] Field of Search ............... 220/270, 276, 266, 306, 220/359; 229/43; 150/0.5

[56] References Cited

U.S. PATENT DOCUMENTS

| | | | |
|---|---|---|---|
| 2,998,158 | 8/1961 | Tupper | 220/276 |
| 3,048,299 | 8/1962 | Hutchinson . | |
| 3,083,858 | 4/1963 | Biedenstein . | |
| 3,096,904 | 7/1963 | Hutchinson . | |
| 3,108,708 | 10/1963 | Betner . | |
| 3,276,616 | 10/1966 | Lurie | 220/276 |
| 3,817,420 | 6/1974 | Heisler | 220/276 |
| 4,207,989 | 6/1980 | Ingemann | 220/270 |
| 4,231,486 | 11/1980 | Bock . | |
| 4,332,332 | 6/1982 | Ingemann | 220/276 |
| 4,362,253 | 12/1982 | Wortley et al. | 220/276 |

FOREIGN PATENT DOCUMENTS 1389351  4/1975  United Kingdom .

*Primary Examiner*—George T. Hall
*Attorney, Agent, or Firm*—Hane, Roberts, Spiecens & Cohen

[57] ABSTRACT

A container comprising a body (1) with a lid (2) initially sealingly engaged on the body. The lid is removable from the body to open the container and is replaceable to close the container. The body has a mouth with a strip (10) of annular extent secured to the lid, the body being provided with an annular weakening zone (6) or notch (7) in the vicinity of the strip where the mouth of the container is secured to the lid. The container is separable at the weakening zone to separate a part of the mouth and the lid together with the strip from the body, the weakening zone being positioned radially inwards of the strip and upon rupture of the weakening zone forming a locating surface for replacement of the lid on the body. Upon reclosure of the lid on the body, the locating surface engages a cooperating part (25) to hold the lid securely on the body such as by snap-engagement.

64 Claims, 11 Drawing Figures

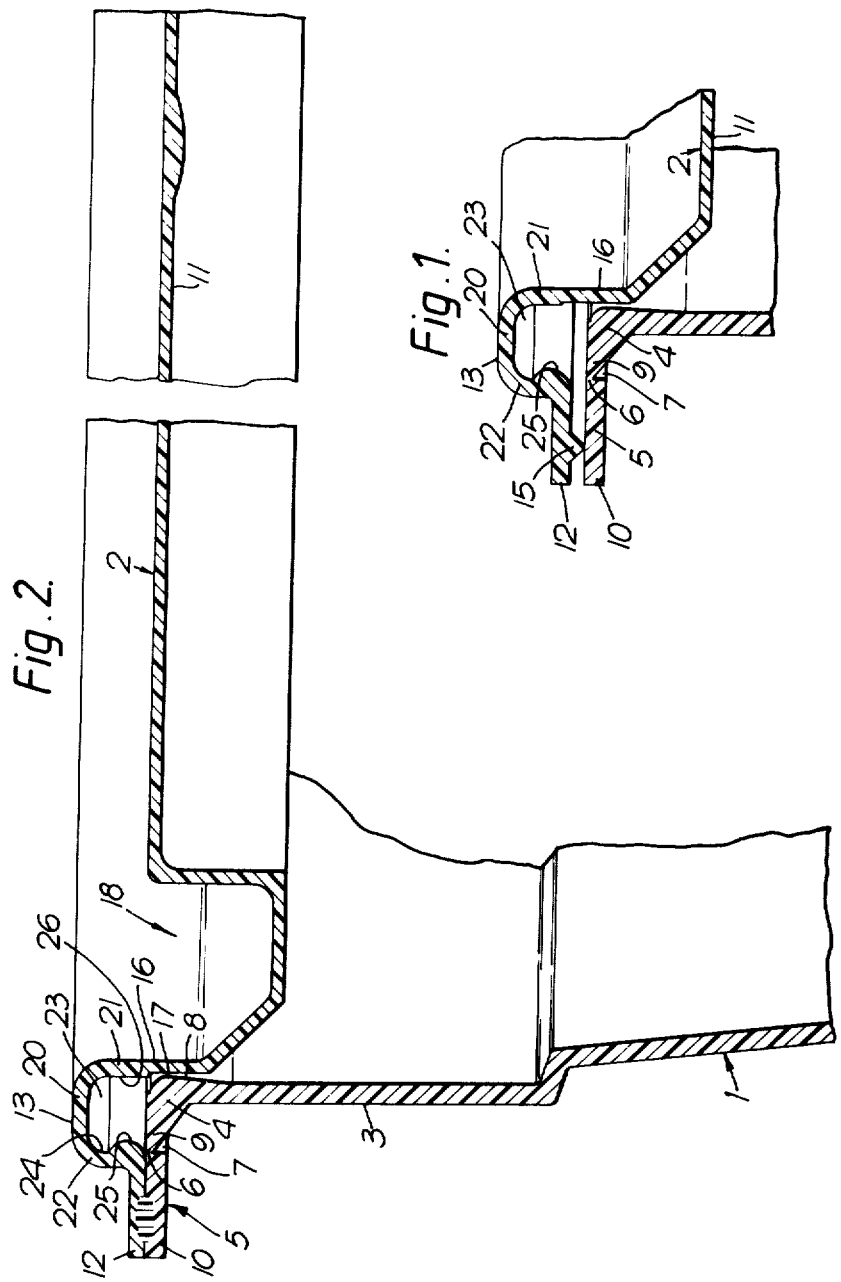

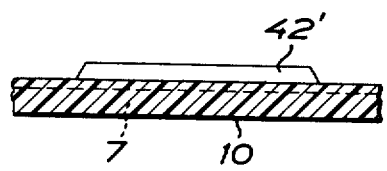
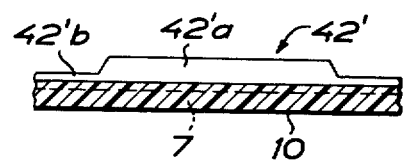
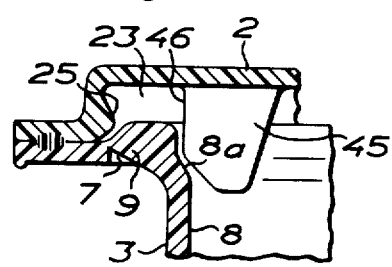
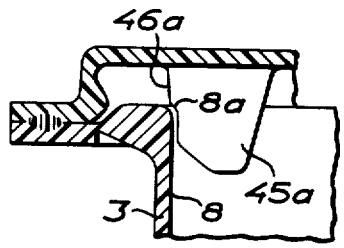
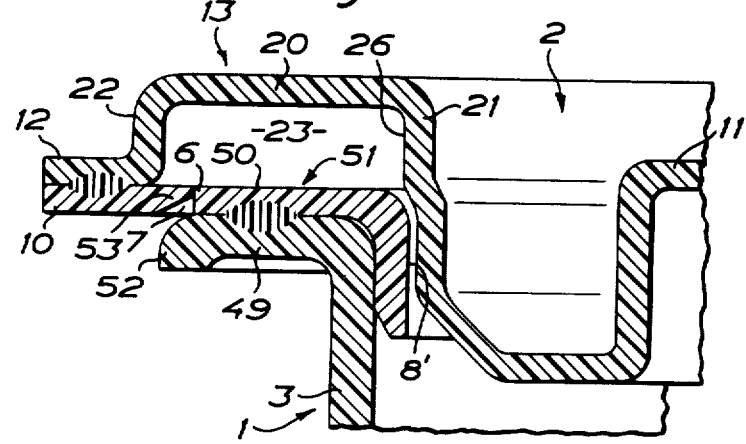

CONTAINER HAVING AN ORIGINALLY SEALED CONDITION WHICH CAN BE OPENED AND THEREAFTER CLOSED

FIELD OF THE INVENTION

This invention relates to a container having an originally sealed condition and adapted for being opened and thereafter closed. The container includes a container body and a lid. The container body comprises a container wall with a rim section including a flange element extending outwardly from the container wall and provided with a weakening zone or notch and a peripheral retaining portion outwards of the weakening zone. The lid includes a central section, a peripheral retaining section sealingly secured to the retaining portion of the flange element, and an intermediate section defining an enclosed space which is open downwards and which includes an upper wall, an inner side wall and an outer side wall and which is arranged to interact with the rim section of the container body when the container is closed after its initial opening.

PRIOR ART

A container of the type described above is disclosed in U.S. Pat. No. 2,998,158, wherein the weakening zone is arranged in two united peripheral sections of the lid and the flange elements of the container body, the container being opened by tearing away an outer strip which is situated radially outside the weakening zone and which must be discarded. Sealing on reclosing is obtained solely by surface contact between the curved intermediate section of the lid and the correspondingly shaped rim section and their flange elements. In the original closure and in reclosing, the lid assumes the same position in relation to the container body, which means that the lid both before the opening of the container and after its reclosing abuts rigidly against the container body. In addition, it is difficult to grasp the lid after it has been reclosed due to the location and the construction of the weakening zone, whereby the outer edge of the lid and the outer edge of the rim section are situated adjacent each other and together form a substantially even surface. A further drawback of the construction shown in U.S. Pat. No. 2,998,158 is that the weakening notches in the lid and in the flange elements of the container body must be accurately aligned relative to each other to make tearing of the weakening zone possible. This requires high precision in the manufacture of both the lid and container.

British Pat. No. 1,473,905 shows a construction, wherein opening of the container after reclosing is facilitated by an edge on the lid projecting from the rim section of the container. This is achieved by placing the weakening zone in the vicinity of the rim section of the container body inside a downward-facing groove in the lid. This construction has the drawback that there is no sealing possiblity between the lid and the flange elements of the container by a permanent connection, such as welding, gluing or the like. Additionally, the container has all the deficiencies mentioned above in connection with the container according to U.S. Pat. No. 2,998,158.

SUMMARY OF THE INVENTION

An object of the present invention is to provide a container which eliminates the above-mentioned deficiencies and which is originally sealed in a hermetic fashion and upon opening of the originally sealed container does not leave any separate parts for discarding, and which is reclosable with secure retention of the lid on the container body in tight-fitting sealed relation with an available gripping means to facilitate the opening of a reclosed container.

A further object of the invention is to provide a container in which the opening of the originally sealed container is facilitated by a lever action.

In opening the container according to the invention, a reinforcement of a peripheral flange of the lid is obtained by securing a portion of the container flange thereto which remains secured upon rupture of the weakening zone. This permits a saving in material, since at least that part of the lid to which the flange of the container is secured can be made relatively thin.

In accordance with one embodiment of the invention, an elevation is provided on the rim section substantially adjacent the weakening zone, for engaging a part forming a snap-on element of the lid to obtain the aforesaid lever action in opening the container.

In order to provide hermetic closure for the originally sealed container the flange of the container body is permanently fixed and sealed to the peripheral flange of the lid, for example, by welding. Between a central section of the lid and the peripheral flange of the lid is an intermediate section which in the originally sealed container assumes an upper position in which the upper wall of the intermediate section is spaced above the flange of the container body. The intermediate section forms an enclosed space with the flange of the container body. The weakening zone or notch defines a locking part which remains attached to the container body upon rupture of the notch, said notch being substantially aligned with an outer side wall of the intermediate section. The portion of the flange of the container body outwards of the notch and the peripheral flange of the lid secured thereto form retaining sections which are permanently joined together to constitute a grip element for opening the container. After the originally sealed container has been opened, the portion of the flange of the container body outwards of the notch forms a unit with the lid. The intermediate section of the lid and the locking part of the container body are provided with means for sealingly holding the lid on the container body upon reclosure of the container, the lid then assuming a lower position, in which the locking part is received in the space in the intermediate section of the lid.

A further feature of the invention is that in opening the container a portion of the flange is retained with the lid to form a part of the peripheral flange of the lid and reinforce the same.

A further feature of the invention is that upon rupture of the notch, a locating surface is formed on one of the ruptured parts of the container at the notch and this locating surface cooperates with an engaging means when the lid is replaced on the container body to provide a snap-engaging action.

According to a particular embodiment of the invention, a locking part remains affixed to the container body after rupture of the notch and said locking part is inserted into a hollow space in the lid to effect the snap-engagement.

In a further embodiment, the wall of the container body undergoes engagement with the lid to provide a second region of engagement when the lid is reengaged with the container. The second region of reengagement can also be snap-engagement which is concurrently effected with the first said snap-engagement of the locating surface with the locking part.

BRIEF DESCRIPTION OF THE DRAWINGS

The invention will be further described in detail in the following with reference to the drawings, wherein:

FIGS. 1 and 2 are cross-sectional views of parts of a container according to an embodiment of the invention before an after closing respectively;

FIG. 5A is a sectional view taken along line 5A—5A in FIG. 5;

FIG. 5B shows a modification of the cross-section in FIG. 5A;

FIGS. 7 and 8 are vertical sectional views of parts of a container according to further embodiments of the invention;

FIG. 11 is a cross-sectional view showing parts of a container according to a further embodiment of the invention.

DETAILED DESCRIPTION

Figure 3:
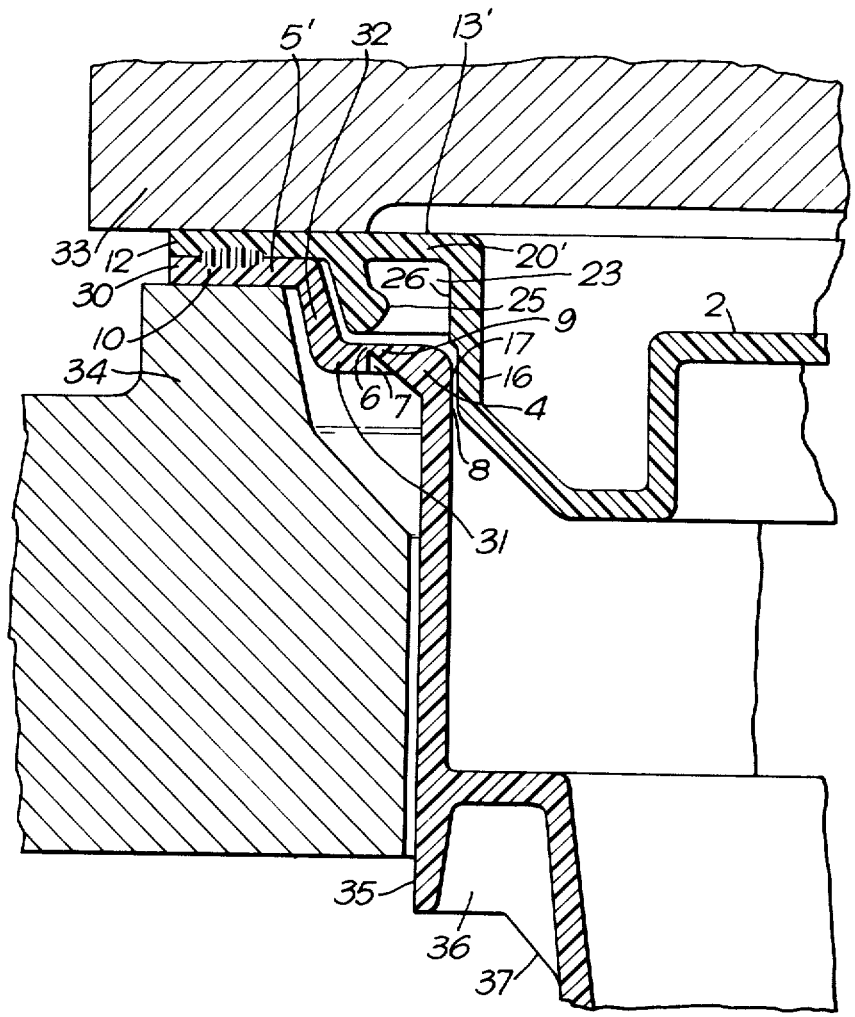
FIG. 3 is a cross-sectional view showing parts of a container according to another embodiment of the invention and parts of a welding apparatus.

With reference to FIG. 2, therein is seen part of a hermetically sealed container comprising a container body 1 and a lid 2, each made of a plastic material. The container body includes a container wall 3 with a mouth including a flange 5 extending radially outwards from the container wall around the entire mouth and which is integrally formed with the container wall at an inner rim section 4. The container may be of any suitable shape, such as circular, rectangular with rounded corners, or oval.

As will be evident from FIGS. 1 and 2, the flange 5 of the container body is flat and extends perpendicular to the center line of the container body. Alternatively, the flange may be directed downwards or upwards in order to form an angle with the center line of up to 90°. The flange is provided with a circumferential weakening zone 6, which in the embodiments shown in FIGS. 1 and 2 is formed by a groove or notch 7 in the lower surface of the flange and which is arranged at a predetermined distance from the center line of the container body or the inside surface 8 of the container wall 3. In the embodiment shown in FIGS. 1 and 2 the groove 7 is provided in the lower surface of the flange but the weakening zone can also be achieved by arranging a similar groove on the upper surface or by providing grooves in each of the surfaces of the flange. When the flange is ruptured at the notch 7, the flange is divided into two functional sections consisting of an inner locking portion 9 and an outer retaining portion 10. The inner locking portion 9 will be formed with an outer locating surface upon rupture of the notch for cooperating with the lid to establish a closed, sealed condition of the lid on the container body when the container is reclosed as will be explained in greater detail later.

The lid 2 includes three functional sections, namely a closing and sealing center section 11, a peripheral retaining section 12, and an intermediate locking section 13. The peripheral retaining section 12 conforms to the shape and position of the retaining portion 10 of the container body and the lid is permanently secured to the container body by means of the retaining section 12. This can be achieved by welding the retaining section 12 of the lid and the retaining portion 10 of the container body to each other, preferably at circumferentially continuous contact surfaces. In the joining procedure, energy is supplied to the contact area, for example, in the form of heat, ultrasonics, high frequency oscillation, or combinations thereof.

In the embodiment shown in FIGS. 1 and 2, the retaining portion 10 has a flat, upper surface while the retaining section 12 is provided with a circumferential weld indication 15 on its underside, which permits the use of ultrasonic welding for the sealing operation. Alternatively, the weld indication can be provided on flange 5. The permanent closure of the container can also be effected with heat welding or a suitable adhesive agent applied to the contact surfaces, even though sealing by means of ultrasonic welding is preferred. Whichever method is used, a hermatic seal is obtained which in itself forms an original closure. In addition, the container has the desirable property of indicating unauthorized opening by a break in the weakening zone 6 and possibly also by the lid fully or partly assuming a position closer to the container body than on a container with an undisturbed closure.

The center section 11 of the lid includes a vertical wall 16 which in the initially sealed closure in FIG. 2 forms a clearance space 17 with the inner surface 8 of wall 3. Thereby, undesired welding of the wall 16 to the wall 3 is avoided when the retaining portion 10 is joined to the retaining section 12 by ultrasonic welding. Alternatively, and particularly when using the container for the storage of liquid, the wall 16 and the wall 3 may be in contact with each other, for example, with frictional contact in order to achieve a tight-fitting sealed relation. The method of joining the retaining portion 10 to the retaining section 12 is then adapted to the existing contact between the wall 16 and the wall 3. The wall 16 is substantially juxtaposed with the upper section of the container wall and is substantially vertical in the embodiment shown in FIG. 1. In addition to providing a stabilizing effect on the lid structure, wall 16 assists in correctly guiding or orienting the lid and the container in relation to each other during the closing operation.

The intermediate locking section 13 is of U-shape and projects above the rim section 4 such that upper wall 20 of intermediate section 13 is located in spaced relation from flange 5 in the initially unopened and sealed condition of the container. The lid thereby assumes an initial upper position. An inner side wall 21 of the intermediate locking section 13 joins the upper wall 20 and the wall 16 of the center section 11. The intermediate locking section 13 further includes an outer side wall 22 which is opposite and spaced at a predetermined distance from the inner side wall 21. The outer side wall 22 extends downwardly from the upper wall 20 and merges with peripheral retaining section 12. The walls 20,21,22 of intermediate section 13 define a circumferential U-shaped groove or space 23 of predetermined size which is adapted to receive the rim section 4 of the container body for reclosing the container after the original hermetic closure thereof has been broken. The rim section 4 thus effectively forms a locking part which enters the space 23 when the container is reclosed. The outer side wall 22 has an inside surface 24 which is aligned with the weakening zone 6 i.e. the notch 7 of the flange element 5 and is provided with a bulge in the form of an inwardly directed bead 25, which preferably extends circumferentially to form one part of a snap-on element for reclosing the container.

During opening of the originally sealed container, the retaining member 10 with the retaining section 12 joined thereto are moved substantially axially and more particularly, upwardly so that the flange is ruptured at the weakening zone formed by notch 7. The container is reclosed by pressing the locking section 13 of the lid onto the rim section 4 so that the rim section enters the space 23 in the locking section 13. When the original closure is broken, no loose part requiring disposal is produced. The locking member 9 of the flange is separated from the outer part of the flange and forms a locating surface which engages the bead 25 of the locking section 13 with snap-engagement upon reclosing the container. After the container is reclosed, the lid assumes a second, lower position. The locating surface on the periphery of locking member 9 of the flange formed on rupture of the notch constitutes the second part of the snap-on element and the locating surface securely snap engages behind the bead 25 against the inner surface 24 at the same time that the opposite inner surface 8 of the wall 3 comes into sealing contact with the surface 26 of the inner wall 21. At least the upper part of the inner surface 8 of the wall 3 is shaped in relation to the inner surface 26 of the inner side wall 21 to ensure good surface contact. Such surface contact is achieved in the embodiment in FIG. 2 in that the surface 26 of the inner side wall 21 is displaced slightly radially outwards in relation to the lower outer surface of the wall 16.

If the container is intended for cheese and the like which during filling is cut with a wire or similar member, it is suitable to form the rim section 4 with a bead or the like which extends upwardly and serves as a guide or support for the wire so that the wire clears the weld surfaces of the container on the upper surface of the flange which are located in a plane below the plane of the surface of the bead. In this way, the weld surfaces are kept clean in a desirable manner.

In an alternative embodiment, a second snap-on element in the form of a bead and groove is arranged at the cooperating surfaces 8,26 when especially strong retention of the lid is required for the reclosed container. In the majority of applications, satisfactory and sufficient locking and sealing are achieved with the first described snap-on element. It is, of course, also possible to omit the first snap-on element and provide only the snap-on on surfaces 8,26.

Apart from the stated advantages, the described embodiment also offers the important advantage that in the original closure the locking and center sections 11 and 13 are axially movable, i.e. elastic due to the presence of enclosed space 23 in section 13 and the optimal inner groove 18 in central section 11. This elasticity is desirable from a storage and transportation viewpoint in that a sealed container is not damaged as easily through natural or careless handling or in the case of an overpressure in the container.

Figure 4:
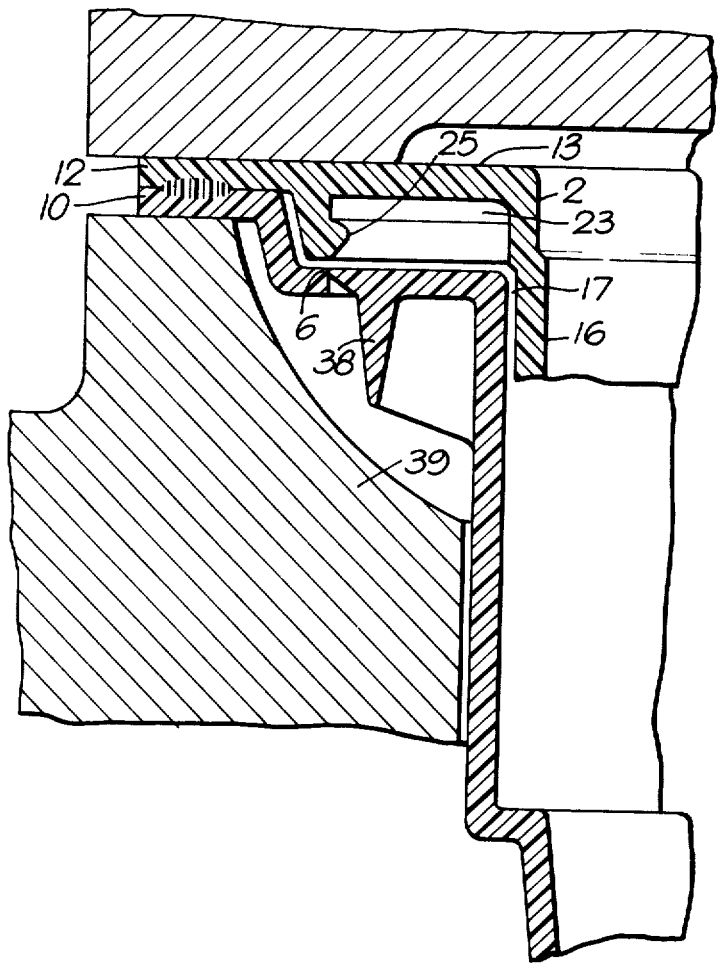
FIG. 4 is a cross-sectional view showing parts of a container according to a further embodiment of the invention and parts of a welding apparatus.

FIGS. 3 and 4 show alternative embodiments of a container according to the invention. The same reference numerals are used to designate the same elements in the figures and similar but modified elements are designated with primes.

In the embodiment shown in FIG. 3, the flange 5' of the container body comprises two flat parallel portions 30, 31 which are located at different levels and at a predetermined spacing from each other. The portions 30 and 31 are joined by a connection portion 32. The locking section 13' of the lid is received in a pocket or shoulder formed by the connection portion 32 and the lower portion 31 of the flange. The peripheral retaining section 12 of the lid is secured to the upper portion 30 of the flange and it lies in the same plane as the upper wall 20' of the intermediate section 13' of the lid. The function is the same as for the embodiment in FIGS. 1 and 2. The embodiment shown in FIG. 3 permits the use of a flat, upper sealing tool 33 which simplifies the positioning of the container body and the lid which are supported by a lower tool or counter support 34.

In the embodiment of FIG. 3 the container body is provided with a lower guiding element which also has a reinforcing effect and which includes a collar 35 and a plurality of radially arranged walls 36 between the collar and the container wall. The radial walls 36 have inclined guiding surfaces 37 which engage the tool or other guiding means when the container is placed in position for joining, for example in a cassette. The guide surface can also be straight, depending on the conicity of the container.

FIG. 4 shows an embodiment which is similar to that shown in FIG. 3 except that the container body has no lower guiding element. The container body is provided with an upper reinforcement 38, and the tool 39 is shaped to guide the container body down into the cassette.

Figure 5:
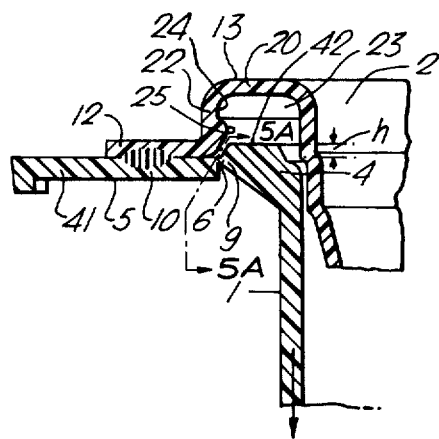
FIG. 5 is a vertical sectional view of parts of a container according to another embodiment of the invention.
Figure 6:
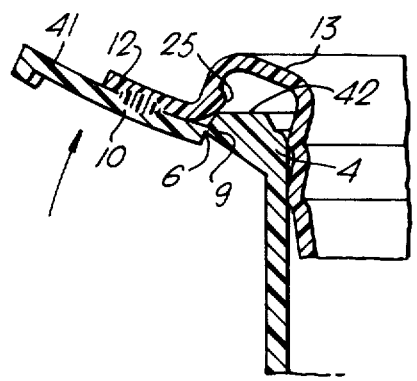
FIG. 6 is a vertical sectional view of the parts of the container in FIG. 5 showing the manner of opening the container.

FIG. 5 illustrates a modified embodiment of the container in FIGS. 1 and 2. The same reference numerals are used to designate the same elements. The locking part or rim section 4 of the flange 5 is formed with a ridge beginning at the outer end of locking portion 9 to form a counter support adjacent the weakening zone 6. The elevation 42 extends upwardly a height h from the upper surface of the retaining portion 10 at the location of the weakening zone. The elevation 42 has a width or radial dimension which substantially corresponds to that of the locking portion 9. A suitable height h of the elevation 42 is 0.3 mm. The elevation 42 on the locking portion 9 adjacent the weakening zone 6 forms a counter support for the bead 25 on the lid to produce a lever action when the retaining portion 10 and the retaining section 12 are bent in an upward direction. The bead 25 and elevation 24 are initially in spaced relation as shown in FIG. 5 and upon upward bending of portion 10 with section 12 secured thereto, the bead 25 and elevation 42 come into contact with one another to serve as a fulcrum and provide the aforesaid lever action to intensify the force tending to rupture the flange at notch 7. In this way, a 30% reduction of the force required for opening the closure can be obtained. However, such reduction is not disadvantageous to an unauthorized opening, since the retaining portion 10 and the retaining section 12 must be bent up a relatively long distance before the lever action is initiated by the contact of the surfaces of bead 25 and elevation 42. For this purpose the elevation 42 is formed with a sloped outer surface such that the space, between the elevation 42 and the bead 25 is initially about 0.5-1.5 mm and is reduced to zero when the lever action commences as is seen in FIG. 6. In those cases where the risk of unauthorized opening is very unlikely such space can be substantially eliminated by extending the elevation 42 towards the bead 25 such that they are substantially in contact in the originally sealed condition of the container, the lever action commencing almost immediately upon lifting of the grip element formed by portion 10 and section 12. By reason of the arrangement of the elevation 42 for cooperation with the bead 25, the weakening zone 6 can be made thicker and greater tolerances can be permitted as regards the weakening zone.

According to a preferred embodiment the container is provided with a defined zone or region for initiating opening of the container. This region is designated by a grip indication in the form of a flap or a tongue 41 projecting outwardly from the portion 10 of flange 5. In normal cases, the initiating region has a peripheral extent of about 20-45°. The ridge like elevation 42' can be restricted to the initiating region in certain applications as shown in FIG. 5A. The aforesaid grip indication can be provided, in certain applications, even when the elevation 42 has the same height around the entire periphery.

According to an alternative embodiment of the container shown in FIG. 5B the rim section 4 can be provided with a continuous elevation 42', i.e. an elevation which extends around the entire periphery, the elevation 42' having a first part 42a' situated within said initiating region with a predetermined greater height, and a second part 42b', which forms the remainder of the elevation around the periphery of the rim section and which has a predetermined, smaller height than that of the first part of the elevation. This greater height preferably is about 0.3 mm and the smaller height about 0.2 mm for typical lid structures. These differences in height are the result of the fact that a reduced force is required after the weakening zone of the container has been broken within the initiating region, where a greater and earlier lever action is present.

In the arrangement with the lever action according to FIGS. 5 and 6 the bead 25 of the locking section 13 has a double function, namely it cooperates with the elevation 42 of the rim section to provide a lever action on the weakening zone, and it serves as an element of snap-engagement means together with the locking portion 9 of the locking part upon rupture of notch 7. The elevation can also be provided on other containers falling within the scope of the invention, for example, in connection with the containers shown in FIGS. 3 and 4, wherein the bead 25 is aligned with or immediately inside the weakening zone 6.

FIGS. 7 and 8 show embodiments, according to which the inner bounding surface of the enclosed space 23 is defined by surfaces 46 of a plurality of depending ribs 45 which are equally spaced around the lid 2. The surfaces 46 of ribs 45 cooperate with the inner surface 8 of wall 3 when the locking portion 9 is snapped into the groove or space 23 behind the bead 25. The opening of an initially sealed container and its subsequent reclosing and reopening is the same as that in the previously described embodiments. The surfaces 46 of the ribs can be supplemented with or replaced by a snap engagement means adapted for cooperating with container wall 3.

In FIG. 7 it is seen that the inner surface 8 of wall 3 is provided with a step 8a so that the surfaces 46 of ribs 45 will be in spaced relation with the wall in the initially closed position. When the notch has been ruptured and the container is thereafter closed, the snap-engagement of bead 25 with the locking portion 9 will be effected concurrently with the engagement of the surfaces 46 of the ribs 45 with the inner surface 8 beyond the step 8a. In this way, a tight-fitting and sealed relation can be effected between the surfaces 46 and the inner surface 8 of the wall 3 of the container in the closed condition. The embodiment illustrated in FIG. 8 is similar in effect to that in FIG. 7 except that the surfaces 46a of the ribs 45a are formed with the step 8a and the inner surface 8 of the wall 3 is flat.

Figure 9:
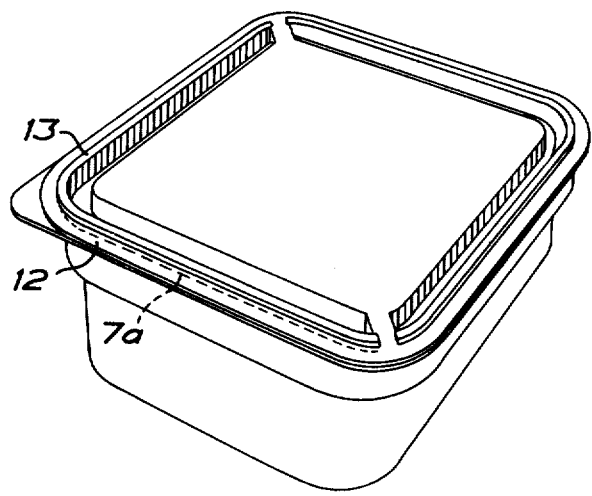
FIG. 9 is a perspective view of another embodiment of a container according to the invention.
Figure 10:
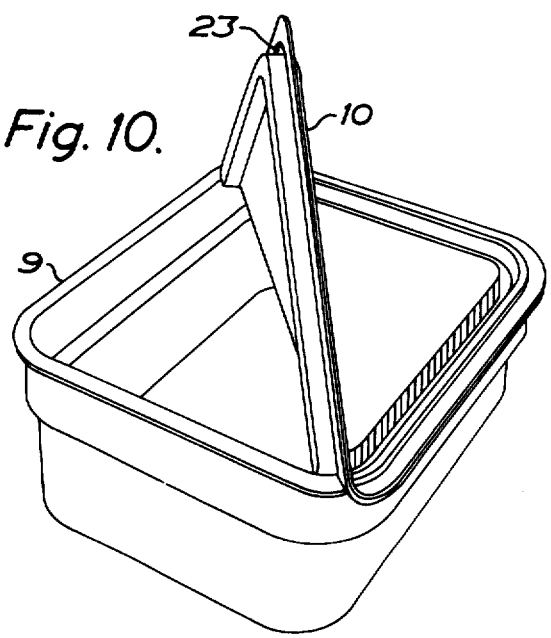
FIG. 10 is a perspective view showing the manner of opening of the container in FIG. 9.

As has been previously noted, the container and accompanying lid may have various cross-sectional shapes. FIGS. 9 and 10 show an embodiment of rectangular outline whose cross-section is the same as that as shown in FIG. 2. However, the cross-sectional shapes in the other embodiments could also be employed in the embodiment shown in FIGS. 9 and 10. In the embodiment of FIGS. 9 and 10 the weakening zone formed by notch 7a is only provided around one-half the peripheral extent of the container. The notch 7a extends approximately from two opposite corners of the container by one-half of its peripheral extent. In opening the container, the connection between the lid and the container body is broken only along the length of the weakening zone i.e. the notch 7a. The lid is then folded upwardly as illustrated in FIG. 10 to permit the contents of the container to be emptied. In order to reclose the container, the lid is folded downwardly and snap-engagement is made between the locking part formed on the container wall and the bead on the lid.

FIG. 11 shows a further embodiment of the invention in which snap-engagement is achieved in a manner somewhat different from that in the previously described embodiments.

More particularly, in FIG. 11, the container body 1 includes container wall 3 as before but instead of the simple integral flange 5, as in the previous embodiments, the container body 1 employs an integral outwardly facing rim 49 to which is secured a separate element 50 of L-shaped cross-section. The rim 49 and element 50 cooperatively form a flange 51 for the container body. The weakening notch 7 is provided in the lower surface of element 50 to form the weakening zone 6 for the flange 51. The inner surface 8' of element 50 serves as the surface for engaging the inner surface 26 of wall 21 of the lid 2. The rim 49 has a peripheral portion 52 which extends beyond the weakening zone 6 to achieve snap-engagement as will be described more fully later. As in the previous embodiments, a retaining portion 10 of the flange is secured, as for example, by welding to the retaining section 12 of the lid 2. The attachment of the rim 49 to the element 50 can also be effected by ultrasonic welding.

In the initially sealed condition as illustrated in FIG. 11, the lid 2 is formed with interior space 23 which is defined by the walls 20, 21 and 22, the space 23 being closed at its underside by the upper surface of flange 51. The container is opened by rupturing the weakening zone 6 at notch 7 by engaging the grip element formed by portion 10 and section 12 and effecting a lifting motion. When this action has been completed, the end region 53 of the retaining portion 10 of element 50 which is formed by rupture of the notch, provides a locating and engaging surface for snap-engagement of the lid to the container body. The portion of the flange 51 which remains attached to the wall 3 of the container body 1 serves as the locking part which penetrates into the space 23 of the lid to produce snap-engagement between portion 52 on the locking part and region 53 on the lid which is formed upon rupture of the notch. Concurrently, surface 8' of the locking part engages surface 26 of wall 21 of the lid.

The construction in FIG. 11 is somewhat simplified from that of the previous embodiments since the lid can be formed without the need to provide the bead 25 and the container body can be formed without need for a strengthened rim portion 4. The lid 2 and container body can each be formed of uniform thickness throughout. The separate element 50 is of simple configuration and can be easily formed and secured to the rim 49 and thereafter secured to the lid after the contents have been introduced into the container.

From the foregoing description, it will become evident that the invention contemplates the combination of a container member and lid member in which the lid member is initially sealingly engaged with the container member and is removable from the container member to open the latter and thereafter is replaceable to close the container member. The assembled combination is deemed to show any evidence of tampering to the ultimate user since the condition of initial sealing will be evident from the continuity of the notch. The container member includes body 1 having the mouth including strip 10 of annular extent secured to the lid member. A first of the members is provided with the annular weakening zone 6 in the vicinity of the strip where the mouth of the container member is secured to the lid member. By rupture of the zone, a part of the mouth and lid member together with the strip are separated from the body to provide two separated parts which can be reengaged by replacement of the lid member with the separated strip secured thereto onto the container member.

The zone is positioned radially inwards of the strip and upon rupture of the zone forms a locating surface for replacement of the lid member on the container member. The locating surface is formed on the body in the embodiments of FIGS. 1–10 and on the lid member in FIG. 11. One of the members includes a U-shaped portion for instance the intermediate section 13 of the lid extending at least partially around the periphery of said one member for insertion of a portion of the other of said members thereinto in the reengaged position of replacement of the lid member on the container member. The portion which is inserted into the U-shape portion is denoted as the locking part which is constituted by the rim section 4 in the embodiments of FIGS. 1–10 and by that part of the flange 51 which remains affixed to the body 1 after rupture of notch 7 in FIG. 11.

The insertion of the locking part into the U-shape portion causes engagement at respective surfaces, one of which is the locating surface and the other of which includes means for providing snap-engagement with the locating surface.

While the invention as been described in relation to specific embodiments thereof, it will become apparent to those skilled in the art that numerous modifications and variations can be made within the scope and spirit of the invention as defined in the appended claims.

What is claimed is:

1. The combination of a container member and lid member in which the lid member is initially sealingly engaged with the container member and is removable from the container member to open the latter and is replaceable to close the container member, said container member including a body having a mouth, said mouth including a strip of annular extent secured to said lid member, a first of said members being provided with an annular weakening notch in the vicinity of said strip where the mouth of the container member is secured to the lid member, said combination being separable at said notch to separate a part of said mouth and the lid member together with said strip from said body, to provide two separated parts which can be reengaged by replacement of said lid member with the separated strip secured thereto onto said container member, said notch being positioned radially inwards of said strip and upon rupture of the notch forming a locating surface for replacement of the lid member on said container member, one of said members including a U-shaped portion extending at least partially around the periphery of said one member for insertion of a portion of the other of said members thereinto in the reengaged position of replacement of the lid member on said container member, the insertion of said portion of the other of said members into the U-shaped portion causing engagement of said members at respective surfaces one of which is said locating surface and the other of which includes means for providing snap engagement with said locating surface.

2. The combination as claimed in claim 1 wherein said member which is provided with said notch forms a locking part upon rupture of said notch, said locking part penetrating into said U-shaped portion of said one member upon reengagement of said members.

3. The combination as claimed in claim 2 wherein said locking part is planar.

4. The combination as claimed in claim 1 wherein said means for providing snap engagement comprises a projecting portion for snap engagement with said locating surface.

5. The combination as claimed in claim 4 wherein said projecting portion comprises a bead.

6. The combination as claimed in claim 1 wherein said U-shaped portion defines an enclosed space with the other of said members in the initially sealed position of the lid and container members.

7. The combination as claimed in claim 1 wherein said strip is formed by at least one weld zone by which the lid member is fixed to the container member.

8. The combination as claimed in claim 1 wherein said body includes a container wall and an annular flange projecting outwardly from said wall, said annular flange having an upper surface which is secured to said lid member and a lower surface in which said notch is provided.

9. The combination as claimed in claim 8 wherein said locating surface is on said strip and said means for providing snap engagement with said locating surface is on said mouth.

10. The combination as claimed in claim 1 wherein said U-shaped portion on said one member has a surface cooperating with an opposed surface on said other member during reengagement of said members in concurrence with the snap engagement of said locating surface with said means for providing snap engagement.

11. The combination as claimed in claim 10 wherein said surface on said U-shaped portion and said cooperating opposed surface on said other member are engaged in tight-fitting relation when the lid member is replaced on the container member.

12. The combination as claimed in claim 10 wherein said surface on said U-shaped portion and said cooperating opposed surface on said other member respectively include means for providing snap engagement between said surfaces when the lid member is replaced on the container member.

13. The combination as claimed in claim 1 wherein said lid member and container member are of polygon cross-section.

14. The combination as claimed in claim 13 wherein said notch extends substantially around one-half of the peripheral extent of said members whereby, after opening, the lid member remains secured to the container member.

15. A container having an originally sealed condition and adapted for being opened and thereafter closed, said container comprising a body and a lid sealingly on said body, said lid being removable from said body to open the container and replaceable to close the container, said body having a mouth including a strip of annular extent secured to said lid, said body being provided with an annular weakening notch in the vicinity of said strip where the mouth of the container is secured to the lid, said container being separable at said notch to separate a part of said mouth and the lid together with said strip from said body, said notch being positioned radially inwards of said strip and upon rupture of the notch forming a locating surface for replacement of the lid on the body and means for engaging said locating surface upon reclosure of said lid on said body to hold said lid securely on said body.

16. A container as claimed in claim 15 wherein said strip is formed by at least one weld zone by which the lid is fixed to the body.

17. A container as claimed in claim 15 wherein said body includes a container wall and an annular flange projecting outwardly from said wall and including said strip, said annular flange having an upper surface which is secured to said lid and a lower surface in which said notch is provided.

18. A container as claimed in claim 17 wherein said locating surface is formed on said mouth, said lid including a wall positioned above said notch, said means for engaging said locating surface comprising a bead on said wall of the lid positioned above said notch such that upon rupture of said notch and reengagement of the lid on the body said bead snap-engages said locating surface.

19. A container as claimed in claim 18 wherein said bead extends annularly on said wall of the lid.

20. A container as claimed in claim 19 wherein said annular flange is planar.

21. A container as claimed in claim 18 wherein said lid includes a central section which projects into said container body at said mouth and upon reengagement of said lid on said container body forms a tight fit therewith.

22. A container as claimed in claim 21 wherein said central section of the lid includes a wall having an outer surface facing said container body for engagement therewith, said outer surface having a step therein.

23. A container as claimed in claim 15 wherein said locating surface and said means for engaging said locating surface are constructed to provide snap engagement therebetween.

24. A container as claimed in claim 23 further comprising second snap engageable means on said lid and body for undergoing snap engagement substantially concurrently with the snap engagement of the first said means and said locating surface.

25. The combination of a container and lid in which the lid is removable from the container to open the latter and is replaceable to close the container, said container including a body having a mouth, said mouth including a strip of annular extent secured to said lid, said body of the container being provided with an annular weakening notch in the vicinity of said strip where the mouth of the container is secured to the lid, said container being separable at said notch to separate a part of said container mouth and the lid together with said strip from said body, said notch being positioned radially inwards of said strip and upon rupture of said notch forming separating parts which can be reengaged upon replacement of the lid on said container, said lid including a hollow portion extending at least partially around the periphery of the lid which forms a substantially enclosed space with said container body, and means on said lid for engaging said container body upon reclosure of said lid on said body.

26. The combination as claimed in claim 25 wherein upon rupture of said notch a locating surface is formed at said mouth on the container body, said means on said lid for engaging said container body cooperating with said locating surface to effect snap-engagement therewith.

27. The combination as claimed in claim 26 wherein said body includes a container wall and an annular flange integral with said wall, said annular flange having an upper surface which is secured to said lid and a lower surface in which said notch is provided, said enclosed space being formed between said hollow portion of said lid and said upper surface of said flange.

28. The combination as claimed in claim 27 wherein said hollow portion of said lid includes an outer wall positioned above said notch, said means on the lid for engaging said container body comprising a bead on said outer wall.

29. The combination as claimed in claim 28 wherein said bead extends annularly on said outer wall of the lid.

30. The combination as claimed in claim 29 wherein said annular flange is planar.

31. The combination as claimed in claim 28 wherein said lid includes a central section which projects into said container body at said mouth and upon reengagement of said lid on said container body forms a tight fit therewith.

32. The combination as claimed in claim 31 wherein said central section of the lid includes a wall having an outer surface facing said container body for engagement therewith, said outer surface having a step therein.

33. The combination as claimed in claim 28 wherein said outer wall has an inner surface substantially aligned with said notch.

34. The combination as claimed in claim 33 wherein said flange includes a locking part which remains attached to the container body upon rupture of said notch, said hollow portion receiving said locking part in said enclosed space upon reengagement of said lid on said container body.

35. The combination as claimed in claim 25 further comprising second snap engageable means on said lid and container body for undergoing snap engagement substantially concurrently with the engagement of said means on said lid and said container body.

36. The combination as claimed in claim 25 wherein said strip is formed by at least one weld zone by which the lid is fixed to the container.

37. A container having an originally sealed condition and adapted for being opened and thereafter closed, said container comprising a body and a lid sealingly on said body, said lid being removable from said body to open the container and replaceable to close the container, said body having a mouth including a flange of annular extent secured to said lid, said flange being provided with an annular weakening notch radially inwards of the location where the flange is secured to the lid, said flange being separable at said notch upon rupture thereof to separate a part of said flange and the lid from said body to open said container which can be reclosed by replacement of the lid on said body, said lid comprising a central section, an outer section secured to said flange, and an intermediate section projecting from said flange to define an enclosed space therewith, said intermediate section including an upper wall spaced from said flange in the originally sealed condition of the container, said flange including a locking part which remains attached to said body upon rupture of said notch, said body with said locking part being insertable into said space in said intermediate section upon reclosure of said container, and means for providing snap-engagement of said lid with said container upon insertion of said locking part into said space.

38. A container as claimed in claim 37 wherein said intermediate section further includes an outer wall, said notch being in substantial alignment with said outer wall.

39. A container as claimed in claim 38 wherein said outer wall has an inner surface, said notch being in substantial alignment with said inner surface.

40. A container as claimed in claim 38 wherein said means for snap engagement of the lid with said body comprises a bead on said inner surface.

41. A container as claimed in claim 40 wherein upon rupture of said notch a locating surface is formed on said locking part, said bead being spaced from said upper wall for undergoing snap engagement with said locating surface only after rupture of said notch.

42. A container as claimed in claim 40 wherein said intermediate section has an inner bounding surface spaced from and facing said outer wall for entering the mouth of the body in tight fitting relation therewith when the lid is replaced on the body.

43. A container as claimed in claim 42 comprising second means for providing snap engagement between said inner bounding surface of said lid and said body upon replacement of the lid on the body.

44. A container as claimed in claim 42 wherein said central section of said lid includes a wall which is spaced from the mouth of said body in the originally sealed condition to permit said flange to be secured to said lid by welding.

45. A container as claimed in claim 42 comprising second means for snap engagement of said inner bounding surface of said intermediate section with said body concurrently with the snap engagement of said bead with said body.

46. A container having an originally sealed condition adapted for being opened and thereafter closed, said container comprising a body and a lid sealingly on said body, said lid being removable from said body to open the container and replaceable to close the container, said body having a mouth including a flange of annular extent secured to said lid, said flange being provided with an annular weakening notch radially inwards of the location where the flange is secured to the lid, said flange being separable at said notch upon rupture thereof to separate a part of said flange and the lid from said body to open said container which can be reclosed by replacement of the lid on said body, said lid and body having opposed surfaces spaced from one another in the originally sealed condition of the container with the notch intact, said opposed surfaces cooperatively coming into contact with one another when the flange is being separated at said notch to form a support to provide a lever action for said lid and that portion of said flange secured thereto to facilitate rupture of said flange at said notch.

47. A container as claimed in claim 46 wherein said flange includes an elevation portion facing said lid and constituting one of said opposed surfaces.

48. A container as claimed in claim 47 wherein said lid includes a central section engaged within the mouth of said body, the other of said opposed surfaces being on said lid, said flange being deflected to rupture said notch, said other surface on said lid contacting said one surface on said elevation portion (42,42') while said central section bears against said body during said deflection to strengthen the mechanical stability necessary to provide said lever action.

49. A container as claimed in claim 47 wherein said elevation portion is provided at least at one location on said flange which represents an opening zone of the lid.

50. A container as claimed in claim 49 wherein said flange includes a radially projecting tongue at said opening zone.

51. A container as claimed in claim 49 wherein said elevation portion extends on said flange over an annular range of 20°-45°.

52. A container as claimed in claim 49 wherein said elevation portion extends upwardly from said flange at a location inwards of said notch by an amount of less than 6 mm.

53. A container as claimed in claim 52 wherein the upward projection of said elevation portion is 0.3 mm.

54. A container as claimed in claim 47 wherein said elevation portion extends over the entire annular extent of said flange.

55. A container as claimed in claim 54 wherein said elevation portion comprises a first part having a predetermined greater height and a second part having a predetermined height which is less than that of the first part.

56. A container as claimed in claim 55 wherein said first part has a height of about 0.3 mm and said second part has a height of about 0.2 mm, said first part being restricted to a particular opening zone.

57. A container as claimed in claim 56 wherein said flange includes a radially projecting tongue at said opening zone.

58. A container comprising a body having an open mouth and a lid on said body covering said mouth, means securing said lid to said body along a permanent closure which hermetically seals said body in an original closure condition for said container, means defining a weakening zone in said body for rupture of said body to form two separated parts which can be reclosed and reopened, one of said separated parts including a portion of the body separated at said weakening zone, the other of said separated parts including said lid with the remainder of the body secured thereto by said closure, said remainder of the body and the lid secured thereto constituting a grip means for engagement by a user to effect initial rupture of the body at said weakening zone and to effect reopening of the container after reclosure, and means on said lid and body for providing tight fitting secured engagement between the separated parts in the reclosed condition, the latter said means including a first engagement element formed on one of said separated parts upon rupture of said body at said weakening zone, and a second engagement element on the other of said separated parts.

59. A container as claimed in claim 58 wherein said one separated part includes a locking part formed upon rupture of said body at said weakening zone, said other separated part having a hollow space for receiving said locking part in said reclosed condition of the container, said means which provides tight fitting secured engagement between the separated parts being operative upon entry of said locking part into said hollow space.

60. A container as claimed in claim 59 comprising a second means on said lid and body for providing tight fitting secured engagement between the separated portion in the reclosed condition at a location spaced from the location at which the first said means provides the tight fitting secured engagement, said second means also being operative upon entry of said locking part into said hollow space.

61. A container as claimed in claim 60 wherein at least one of said first and second means provides snap engagement between said separated parts.

62. A container as claimed in claim 59 wherein in said original closure condition of said container, said lid is in an upper raised position in which said hollow space faces said locking part, said lid being lowered on said body in said reclosed position with said locking part received in said hollow space.

63. A container as claimed in claim 62 wherein said hollow space extends around the periphery of said lid at least along a portion of the angular extent thereof.

64. A container as claimed in claim 63 wherein said closure between the lid and body extends entirely around the periphery of said container.

* * * * *